(12) United States Patent
Yoo et al.

(10) Patent No.: US 6,297,935 B1
(45) Date of Patent: Oct. 2, 2001

(54) CONNECTING DEVICE FOR USE IN A HEAD DRUM ASSEMBLY

(75) Inventors: Dae Sun Yoo; Dong Han Kang; Kook Hyun Park, all of Seoul (KR)

(73) Assignee: Daewoo Electronics Co., LTD, Seoul (KR)

( * ) Notice: Subject to any disclaimer, the term of this patent is extended or adjusted under 35 U.S.C. 154(b) by 0 days.

(21) Appl. No.: 09/302,184

(22) Filed: Apr. 30, 1999

(30) Foreign Application Priority Data

Apr. 30, 1998 (KR) ................................................ 98-15540
Apr. 30, 1998 (KR) ................................................ 98-15541

(51) Int. Cl.[7] ............................ G11B 21/04; G11B 15/60
(52) U.S. Cl. ................................... 360/271.1; 360/130.32
(58) Field of Search ........................ 360/130.24, 130.22, 360/130.32, 84, 271.1, 271.5, 271.6, 271.01

(56) References Cited

U.S. PATENT DOCUMENTS 5,999,381 * 12/1999 Hong et al. ..................... 360/130.32

FOREIGN PATENT DOCUMENTS 0599641    6/1994   (EP) .

OTHER PUBLICATIONS

Search Report under Section 17(5).

* cited by examiner

*Primary Examiner*—Allen Cao
(74) *Attorney, Agent, or Firm*—Pennie & Edmonds LLP

(57) ABSTRACT

A head drum assembly for use in a tape recorder includes a holder of a general circular shape having a center hole through which a flange is fitted, a plurality of bosses on top thereof. Each of the bosses is provided with an assembling hole. The head drum assembly further includes a plurality of connectors. Each of the connectors has a body provided with a pair of posts insertable into the assembling hole for allowing the body to be maintained on the holder, a terminal plate for elastically contacting the video head and for elastically contacting the lower transformer. The terminal plate is integrally formed with the body.

10 Claims, 16 Drawing Sheets

CONNECTING DEVICE FOR USE IN A HEAD DRUM ASSEMBLY

FIELD OF THE INVENTION

The present invention relates to a head drum assembly for use in a tape recorder; and, more particularly, to a connecting device capable of easily connecting a rotary transformer to a video head in a head drum assembly.

BACKGROUND OF THE INVENTION

A tape recorder, such as a video cassette recorder or a video camera, includes a head drum assembly containing a video head which is used to either record or play back the video portion on or off a magnetic tape, an upper drum, a lower drum and a pair of transformers. The head drum assembly is assembled through a series of delicate and time-consuming assembling operations. A locating operation of the video head onto the upper drum and a gap adjustment operation between the transformers and a connecting operation between the video head and a rotary transformer are examples of such particular operations. These operations take a large portion of the total time required in assembling the head drum assembly. In order to reduce the total assembling time of the head drum assembly, various structural modifications have been proposed. One of the prior art head drum assemblies consists of an upper drum and a lower drum which are positioned around an upper portion and a lower portion of a shaft, respectively. The upper drum has a center hole into which a flange is closely fitted. The upper drum also has at least two video heads fastened to a lower surface thereof. The video head has coils wound therearound.

The flange is provided with a rotor transformer fixed on a lower surface thereof. The rotor transformer has a plurality of channels where coils are positioned in a coaxial relationship, respectively.

On the other hand, the coils of the video head and the coils of the rotor transformer are connected with each other by soldering.

However, this type of prior art head drum assembly has a shortcoming in that it is not easy to assemble, due mainly to the way the video head is connected to the rotor transformer, i.e., by soldering. It is difficult to connect the video head and the rotor transformer by using an automated soldering device, since it is too thin or too weak for the coil of the two members to endure thermal energy emitted therefrom.

SUMMARY OF THE INVENTION

It is, therefore, a primary object of the invention to provide a connecting device mounted within a head drum assembly capable of facilitating an easy electrical connection between a video head and a rotor transformer.

Another object of the present invention is to provide a connecting device capable of maintaining a good electrical connecting condition between the video head and the rotor transformer.

Another object of the present invention is to provide a connecting device having a compatibility both with a two-head type head drum assembly and a multi-head type head drum assembly.

The above and other objects of the invention are accomplished by providing a head drum assembly for use in a tape recorder including a holder of a general circular shape having a center hole through which a flange is fitted, a plurality of bosses on top thereof. Each of the bosses is provided with an assembling hole. The head drum assembly further includes a plurality of connectors. Each of the connectors has a body provided with a pair of posts insertable into the assembling hole for allowing the body to be maintained on the holder, a terminal plate for elastically contacting the video head and for elastically contacting the lower transformer. The terminal plate is integrally formed with the body.

As a modification of the present invention, there is provided a head drum assembly comprising: a flange closely fitted into the center hole of the upper drum and having a through hole through which an upper portion of the shaft is mounted and a pair of center protuberances, each of the center protuberances having a pair of edge protuberances formed on both sides thereof; a holder having a first semi circular member and a second semi circular member, each of the semi circular members having a pair of retainers engaging with the pair of edge protuberances, respectively, and a plurality of bosses o n top thereof, each of the bosses provided with an assembling hole; and a plurality of connectors, each of the connectors having a body provided with a p air of posts insertable into the assembling hole for allowing the body to be maintained on the holder, a terminal plate for elastically contacting the video head and for elastically contacting the lower transformer, the terminal plate being integrally formed with the body.

BRIEF DESCRIPTION OF THE DRAWINGS

The above and other objects and features of the present invention will be come apparent from the following description of preferred embodiments, when taken in conjunction with the accompanying drawings, in which.

DETAILED DESCRIPTION OF THE PREFERRED EMBODIMENTS

A first preferred embodiment of the inventive head drum assembly will now be described with reference to accompanying drawings.

Figure 1:
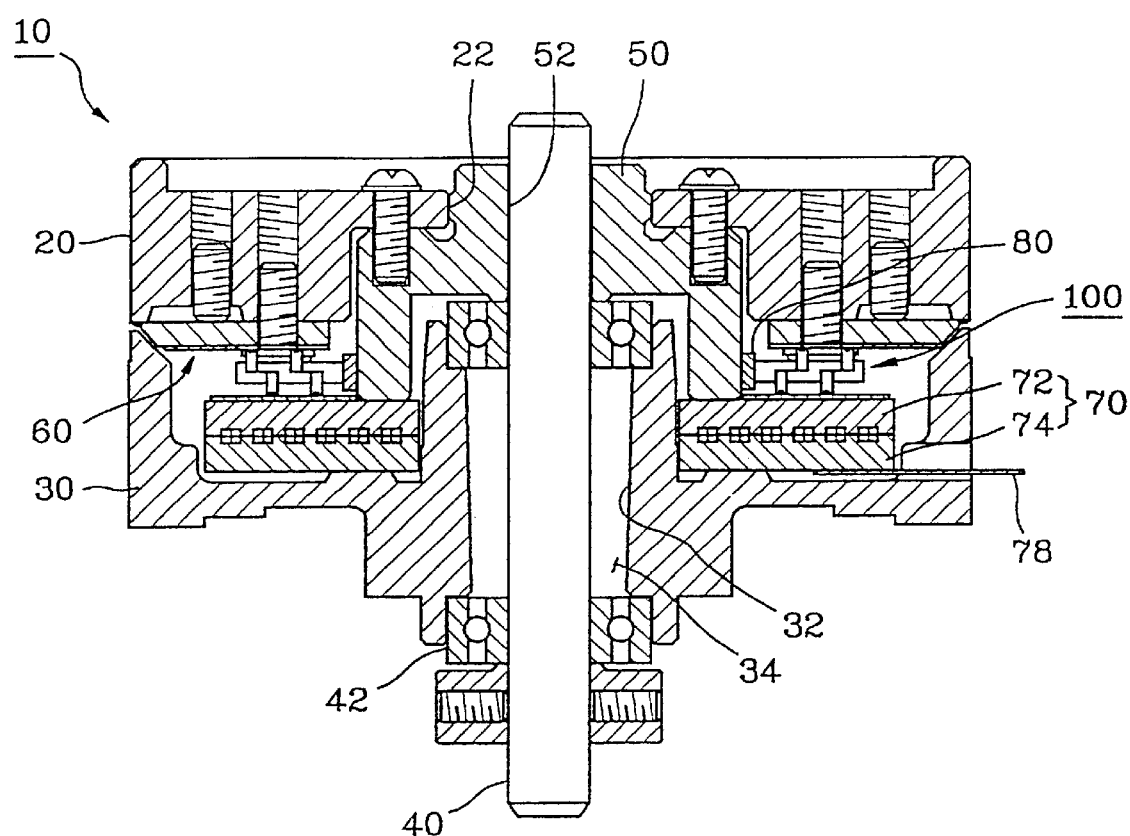
FIG. 1 shows a section al view of the inventive head drum assembly.
Figure 2:
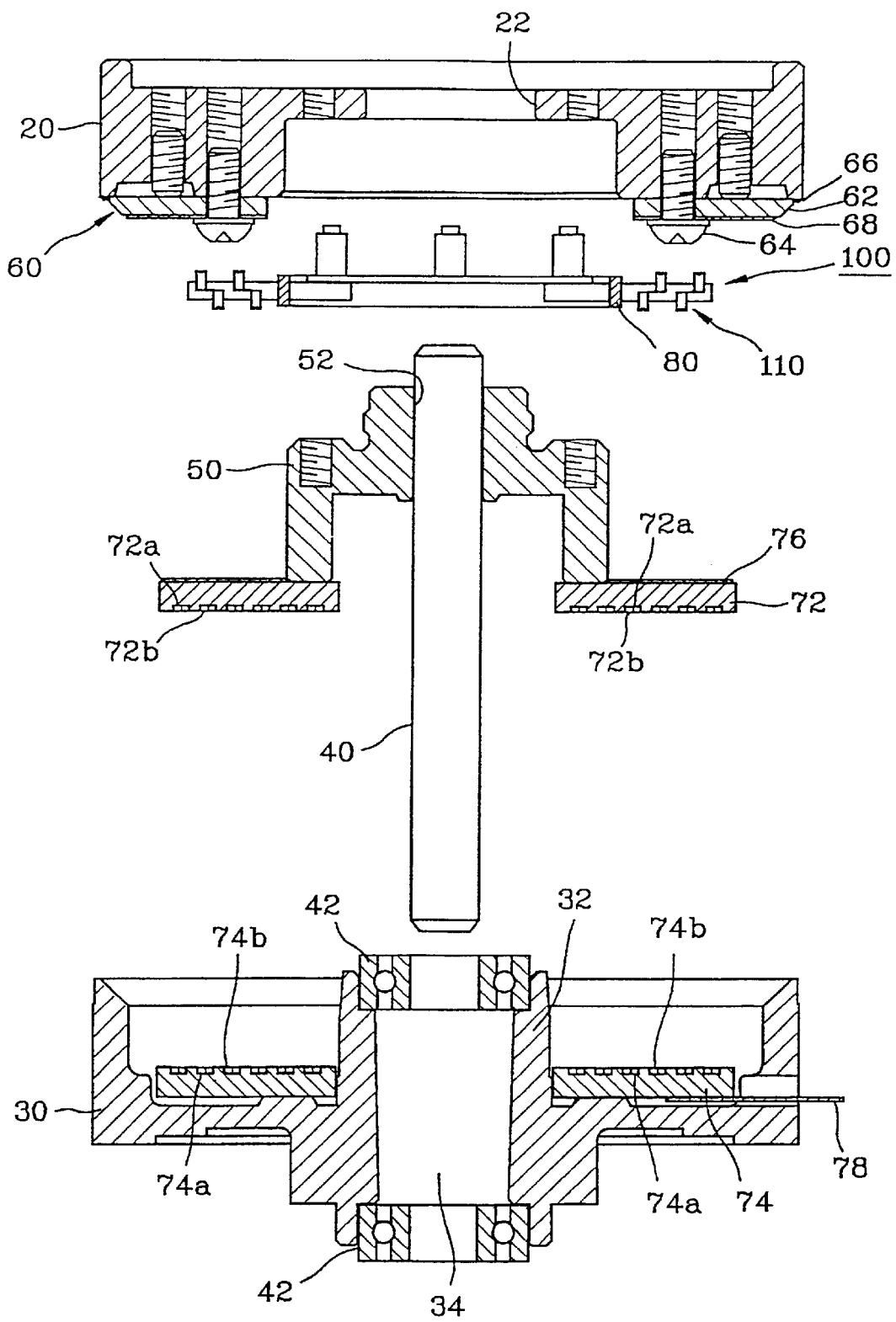
FIG. 2 represents an exploded sectional view of the inventive head drum assembly.
Figure 10:
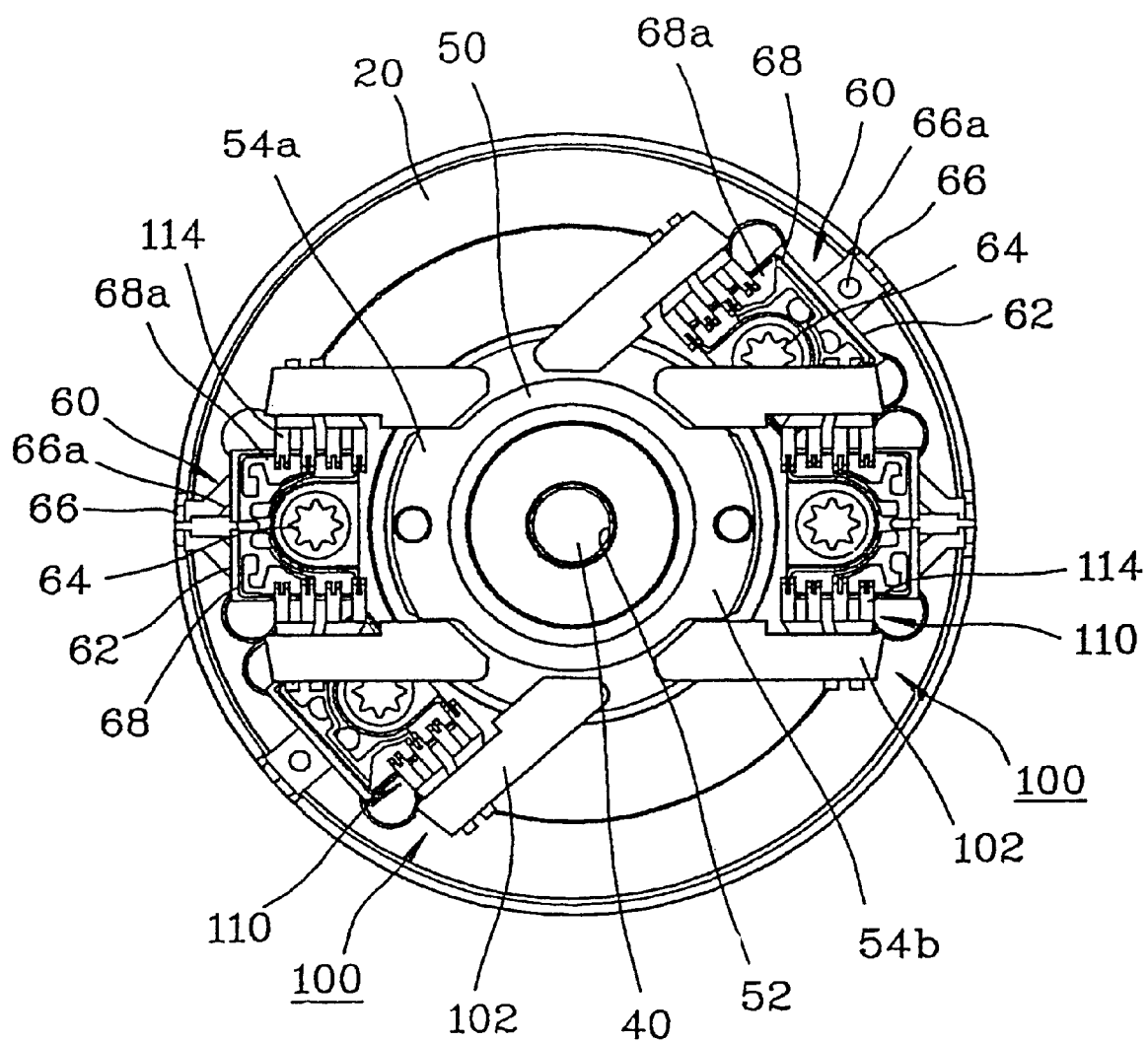
FIG. 10 shows a bottom view of an upper drum and a video head assembled thereonto in accordance with the first embodiment of the present invention.

As shown in FIGS. 1, 2 and 10, the head drum assembly 10 includes an upper drum 20 and a lower drum 30 which are mounted around an upper and a lower portions of a shaft 40, respectively. A center hole 22 is formed through the upper drum 20; and a flange 50 is closely fitted into the center hole 22. The flange 50 has a shaft hole 52 into which the upper portion of the shaft 40 is closely fitted. A bearing housing 42 having a shaft hole 34 is formed through a center of the lower drum 30. The lower portion of the shaft 40 is positioned through the shaft hole 34 via one of a pair of bearings 42. The bearings 42 are mounted through an upper portion and a lower portion of the shaft hole 34, respectively to rotatably support the shaft 40. An oilless bearing or ball bearing can be used as the bearings 42.

As shown in FIGS. 2 and 10, at least two video heads 60 are mounted on a bottom surface of the upper drum 20. Each of the video heads 60 is fixed to the bottom surface of the upper drum 20 by driving a thread 64 into a base 62 to which a head chip 66 wound by a coil 66a is attached. A printed circuit board (PCB) 68 is attached on a lower surface of the base 62. Formed on a lower surface of the PCB 68 is a land 68a on which the coil 66a of the head chip 66 is soldered(see FIG. 10). The land 68a made of thin brass plate preferably has an oval shape, or a circular shape or etc.

Figure 11:
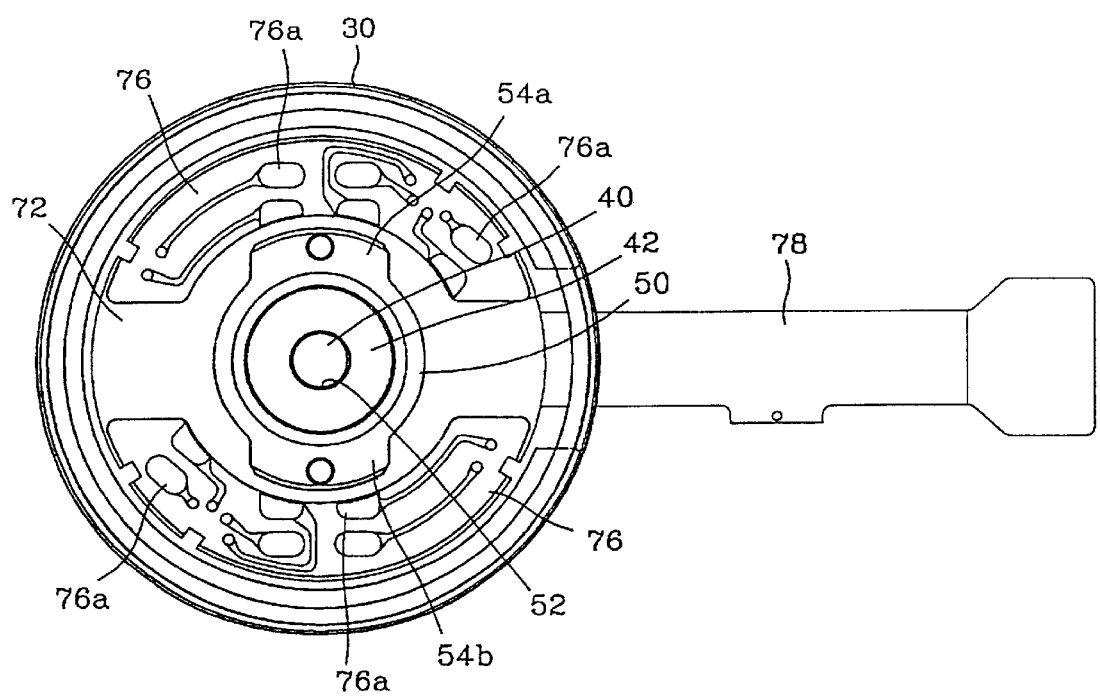
FIG. 11 describes a top planar view of a lower drum and a rotor transformer employed in the inventive head drum assembly in accordance with the first embodiment.
Figure 12:
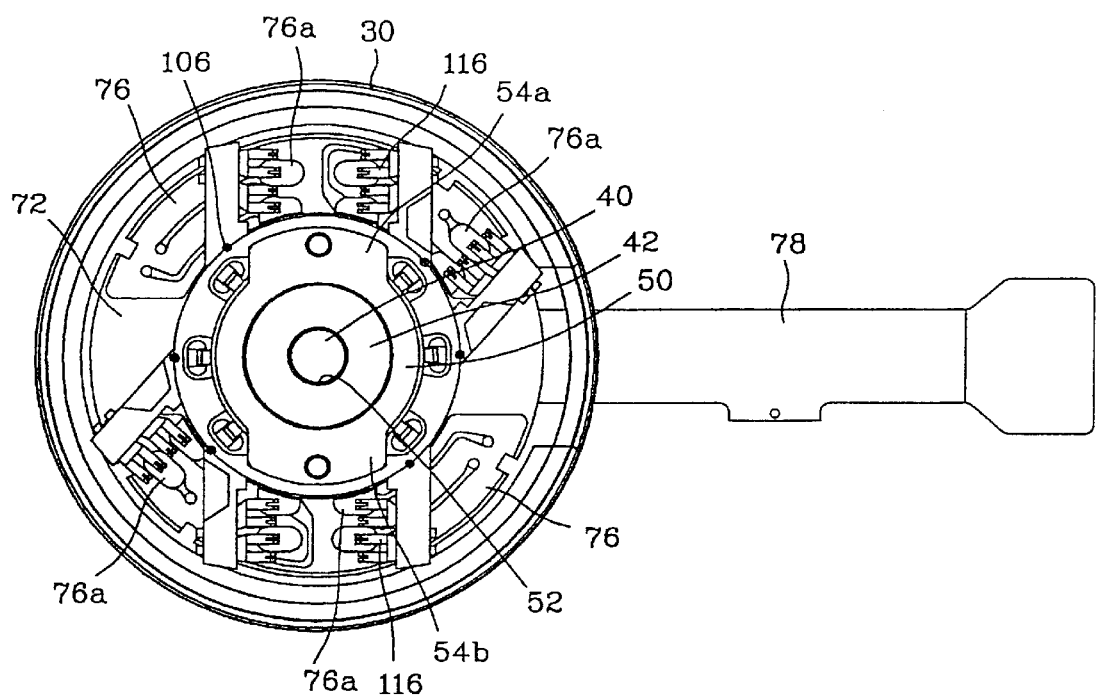
FIG. 12 illustrates a top planar view of a connection between the rotor transformer and a connector in accordance with the present invention.
Figure 13A:
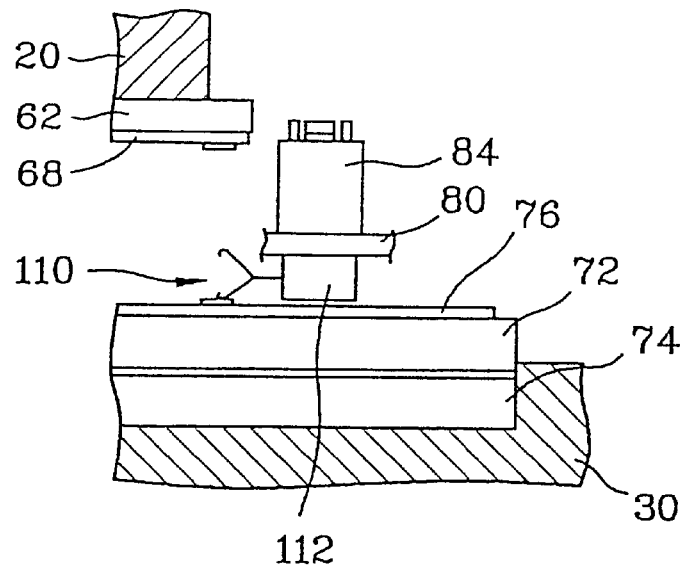
FIGS. 13A and 13B are partial sectional views of the connector in the inventive head drum assembly.
Figure 13B:
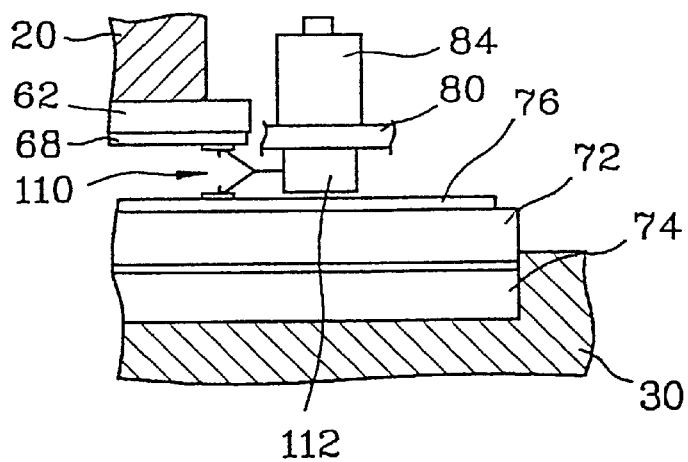
Figure 14:
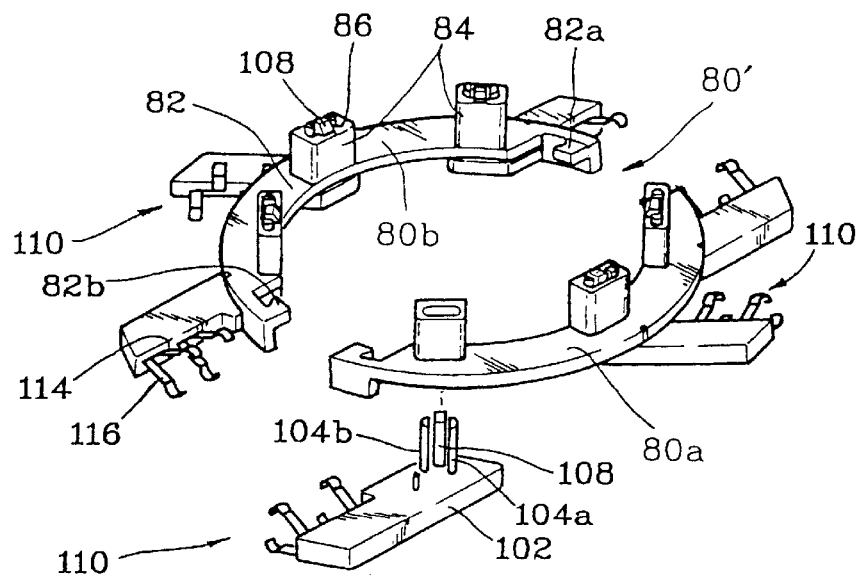
FIG. 14 presents an exploded perspective view of a connecting device in accordance with a second embodiment of the present invention.
Figure 15A:
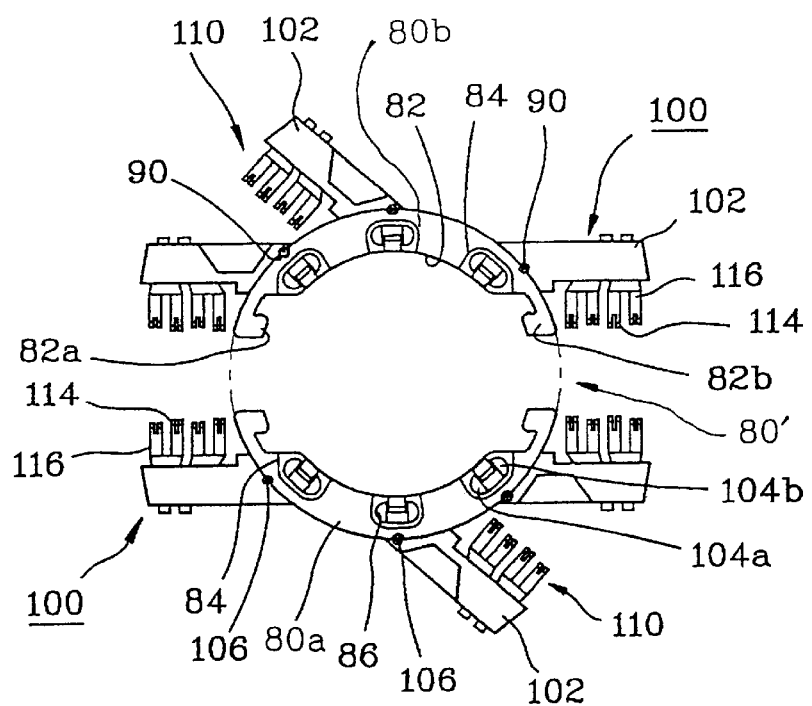
FIGS. 15A and 15B represent a top planar view and a frontal elevational view of the connecting device in accordance with the second embodiment, respectively.
Figure 15B:
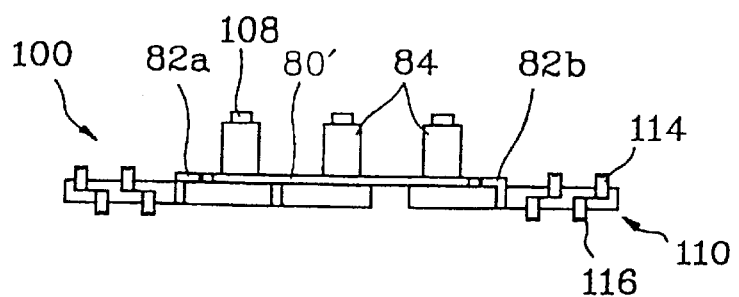

As shown in FIGS. 1, 2 and 11, transformers 70 are mounted between the upper drum 20 and the lower drum 30. The transformers 70 include a rotor transformer 72 attached on a lower surface of the flange 50 and a stator transformer 74 attached on a top surface of the lower drum 30. At least two channels 72a and 74a in a form of a concentric circle are formed on both the rotor transformer and the stator transformer 72 and 74. Coils 72b and 74b are positioned within the channels 72a and 74a. The rotor transformer 72 has a PCB 76 attached thereto on whose upper surface a land 76a is formed(see FIG. 11). On the land 76a, the coil 72b of the rotor transformer 72 is connected by soldering. The land 76a made of thin brass plate preferably has an oval shape, or a circular shape or etc. The coil 74b of the stator transformer 74 is connected to a data processing unit(not shown) through a PCB 78.

On the other hand, the number of channels 72a and 74a is identical to that of the video heads 60. The head drum assembly exemplary shown in FIG. 10 has six video heads 60 and six channels.

In this embodiment, the upper drum 20 is rotated along with the shaft 40 by a driving motor(not shown). However, the head drum assembly can be constructed in such a manner to allow the upper drum 20 to rotate around the shaft 40. At the moment, the driving motor is normally mounted an upper portion of the upper drum 20.

Figure 4:
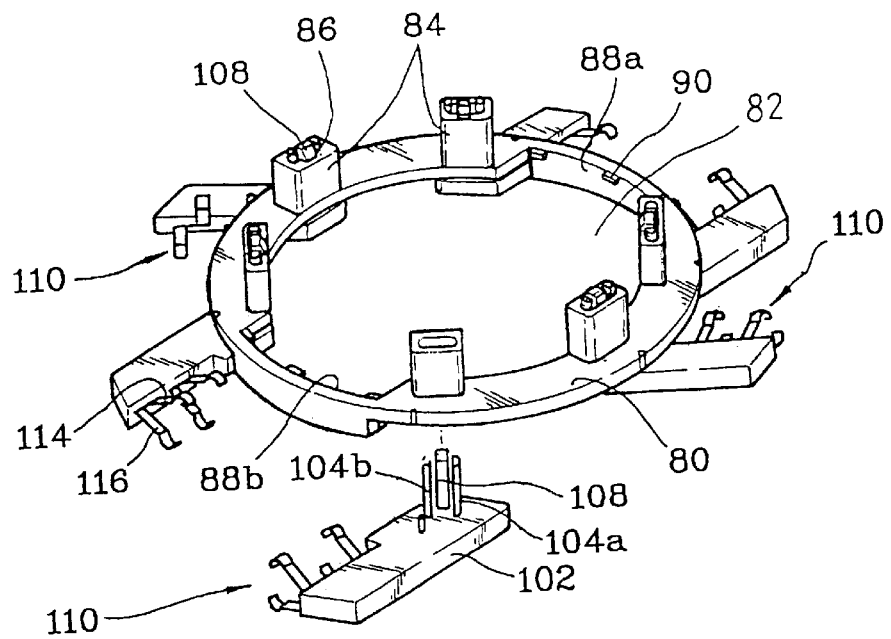
FIG. 4 describes a perspective view of a connecting device of a first embodiment of the inventive head drum assembly.
Figure 6:
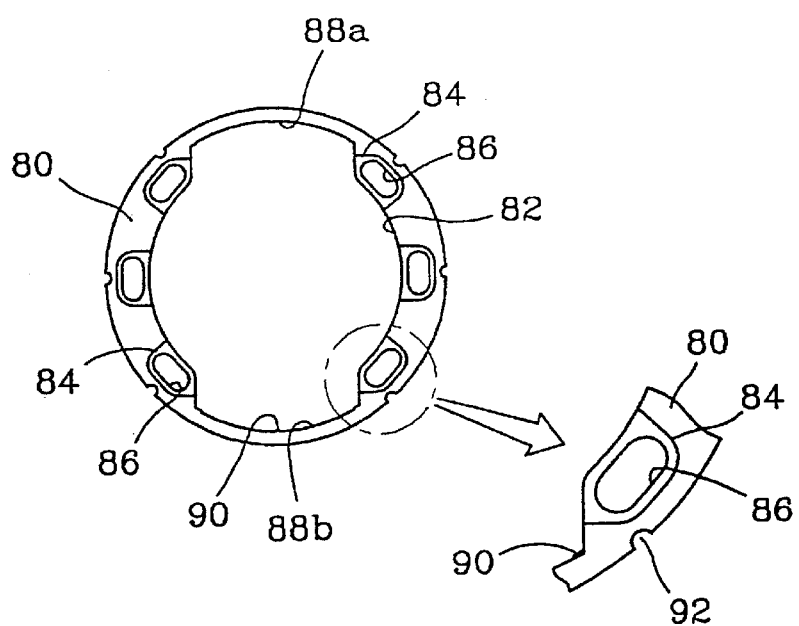
FIG. 6 gives a top planar view of a holder of the connecting device in accordance with the first embodiment.

Referring to FIGS. 2, 4 and 6, mounted under the flange 50 is a holder 80 having an annular shape and, preferably, made of synthetic resin by a molding process. A center hole 82 is formed through the holder 80 to accommodate the flange 50(see FIG. 4). On a top surface of the holder 80, a plurality of bosses 84, each of which has an assembling hole 86 formed therethrough, are formed. Though the assembling hole 86 has an elongated shape in this embodiment, it may have other shapes, e.g., a rectangular shape or a triangular shape or the like. In FIG. 4, though the holder 80 has six bosses 84, it should be noted that the number of bosses 84 depends on the number of video heads 60.

Referring to FIGS. 4, 10 and 11, a pair of protuberances 54a and 54b opposite to each other extend from a periphery of the flange 50. To accommodate the protuberances 54a and 54b, the holder 80 has descent portions 88a and 88b. (see FIG. 4). With the protuberances 54a and 54b and the descent portions 88a and 88b, the holder 80 can be exactly positioned around the flange 50, being guided not to rotate with respect to the flange 50, during installing of the holder 80.

Figure 5A:
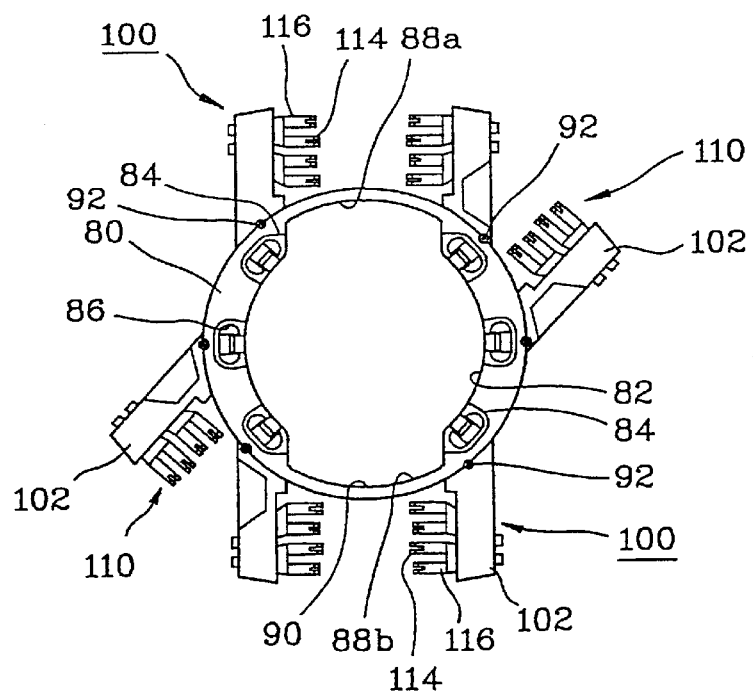
FIGS. 5A and 5B present a top planar view and a bottom view of the connecting device of the first embodiment, respectively.
Figure 9A:
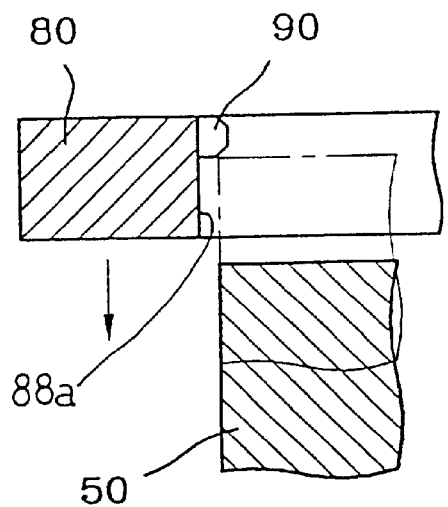
FIGS. 9A and 9B are sectional views of a flange and a holder assembled thereinto in the connecting device, respectively.
Figure 9B:
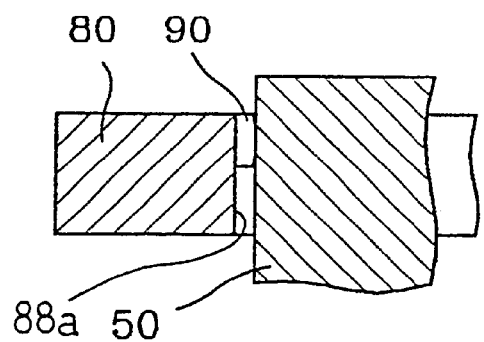

As shown in FIGS. 5a, 9a and 9b, a plurality of lugs 90 are formed on inner surfaces of the descent portions 88a and 88b. The lugs 90 can be transformable to be closely contacted on the periphery of the flange 50. A shape of the lugs 90 can be one of a semi circular shape, a triangular shape, a rectangular shape and etc.. The lugs 90 allow the holder 80 to be retained around the flange 50 in a firmly closed condition therearound.

As shown in FIG. 5a, a plurality of guiding grooves 92 are formed on the holder 80. Each of the grooves 92 is arranged near each of the bosses 84. Though each of the grooves 92 has a semi-circular shape, it can be shaped into a rectangular shape, a triangular shape or etc.. Further, the positions of the grooves 92 can be modified appropriately.

As shown in FIGS. 4, 5a, 5b and 7a, a connector 100 is assembled into the assembling hole 86. The connector 100 has a body 102 made of synthetic resin. As well illustrated in FIGS. 4 and 7a, the body 102 has a general rectangular shape, a pair of posts 104a and 104b protruding therefrom and spaced from each other and inserted into the assembling hole 86. When the posts 104a and 104b are being inserted into the assembling hole 86, they are initially elastically transformed toward each other and then restored to their original states. Though the posts 104a and 104b are a pair in this embodiment, they can be replaced with a boss type post insertable into the assembling hole 86.

Referring to FIGS. 7a, 7b, 8a and 8b, a pin 106 protrudes from an upper surface of the body 102 near the posts 104a and 104b. The pin 106 is inserted into one of the guiding grooves 92 to keep the connector 100 in a constant orientation with respect to the holder 80. A hook 108 also protrudes from the upper surface of the body 102 between the posts 104a and 104b. Since the hook 108 has a head 108a, it can snap to an upper surface of the boss 84 after it is inserted into the assembling hole 86, thereby allowing the connector 100 to be firmly retained with the holder 80.

Figure 7A:
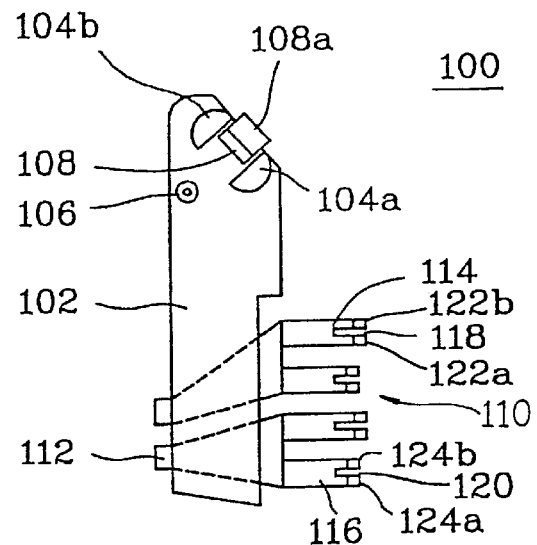
FIGS. 7A and 7B depict a top planar view and a frontal elevational view of a connector of the connecting device, respectively.
Figure 7B:
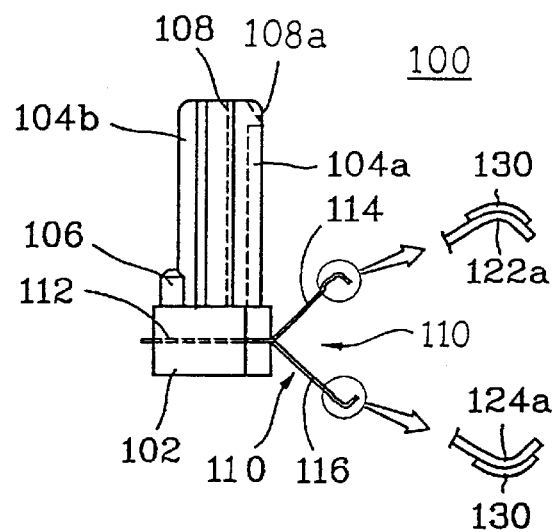

As best illustrated in FIG. 7a, formed with an end of the body 102 is a terminal plate 110 which electrically connects the video head 60 to the rotor transformer 72. The terminal plate 110 can be integrally formed within the body 102 by an insert molding. It is preferable that the terminal plate 110 be made of brass. The terminal plate 110 is provided with an inner plate and an outer plate. Each of the plate has a fixed plate 112 fixed through the body 102 and a first and a second spring plates 114 and 116 extending from the fixed plate 112. Each of the spring plates 114 and 116 is bent up and down, respectively, as shown in FIG. 7b.

Returning to FIG. 7a, the first spring plate 114 has a first contact 122a and a second contact 122b at its free end, while the second spring plate 116 has a first contact 124a and a second contact 124b at its free end. A slit 118 is formed between the first contact 122a and the second contact 122b, while a slit 120 is formed between the first contact 124a and the second contact 124b. As shown in FIG. 7b, a thin golden film 130 having a good conductivity is attached on a contact surface of each of the contacts 122a, 122b, 124a and 124b in order to reduce a resistance at an contact point of the contacts 122a, 122b, 124a and 124b.

Figure 8A:
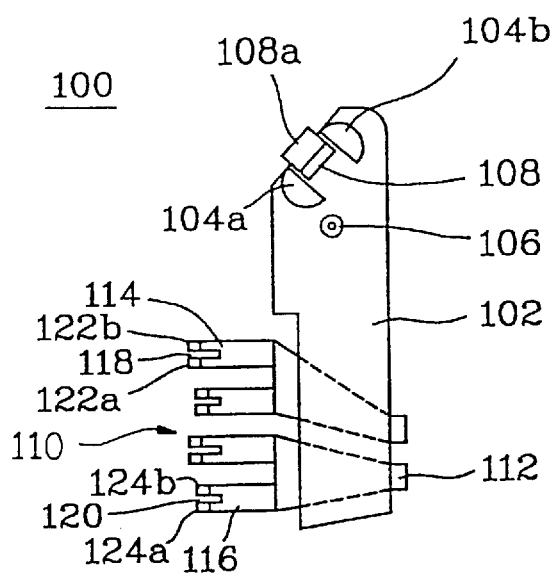
FIGS. 8A and 8B offer a top planar view and a frontal elevational view of an example of the connector of the connecting device, respectively.
Figure 8B:
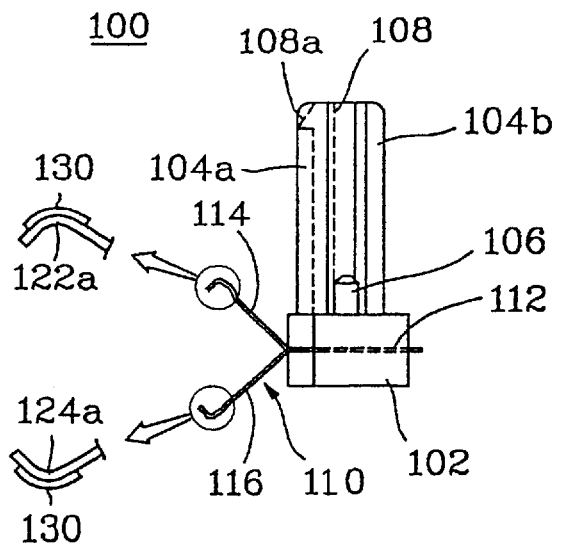

As shown in FIGS. 7a and 8a, there are two types of connectors 100 in this embodiment. In a type as shown in FIG. 7a, the spring plates 114 and 116 extend toward a right side from the body 102 and the pin 106 is biased toward an edge of the body 102. The other type connector 100 shown in FIG. 8a has the spring plates 114 and 116 extending toward a left side from the body 102 and the pin 106 is positioned in a mid portion of entire width of the body 102. Differentiating the position of the pin 106 in the body 102 from one another according to the types of the connectors 100 can prevent a confusion in assembling the connector 100 into the holder 80 which may occur since the connectors 100 different in type are similar to each other.

Assembling the connecting device into the head drum assembly in accordance with the present invention is now described hereinbelow.

Figure 3:
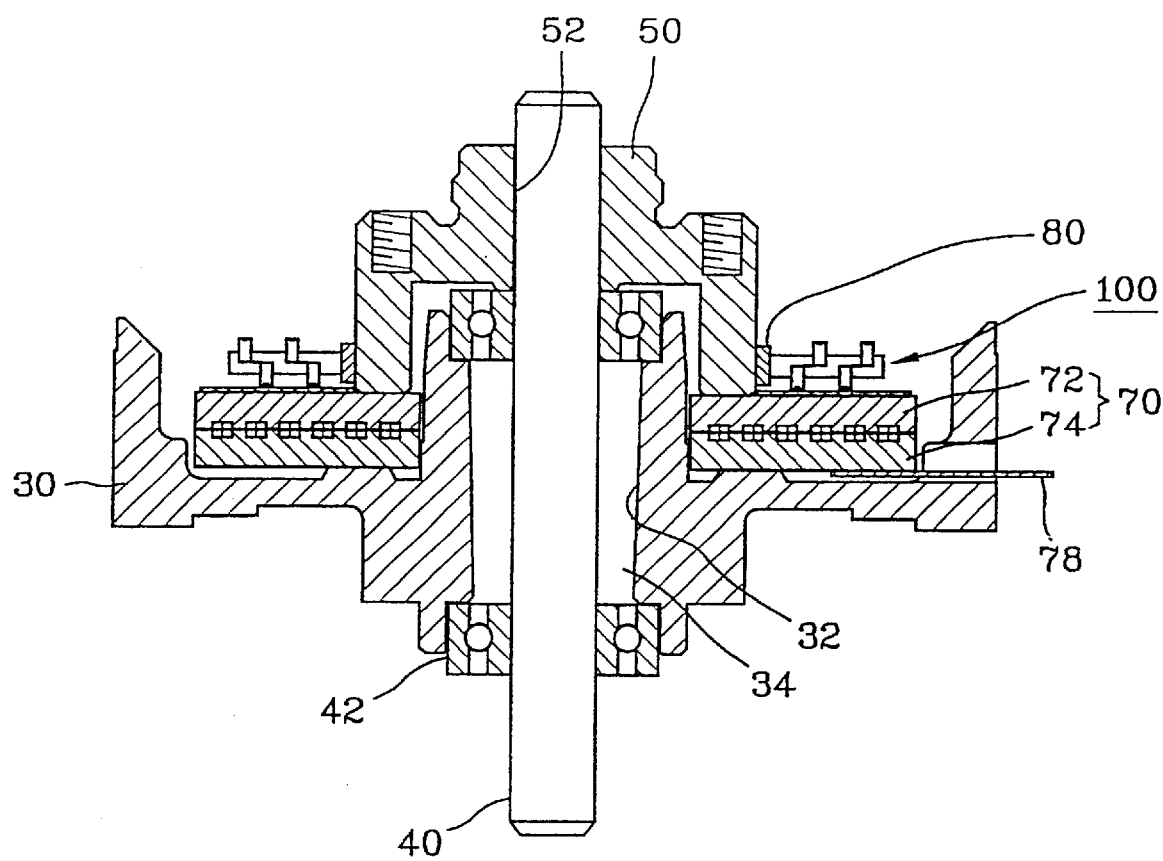
FIG. 3 illustrates a sectional view of a lower drum in an assembled state of the head drum assembly shown in FIG. 2.

As shown in FIGS. 2 and 3, the base 62 is first fixed on the lower surface of the video head 60 through the thread 64. Next, the rotor transformer 72 is attached on a lower surface of the flange 50 via an adhesive; and the stator transformer 74 is also attached on a top surface of the lower drum 30 by the adhesive. The lower portion of the shaft 40 is positioned into the shaft hole 34 of the bearing housing 32 through the bearing 42, the upper portion of the shaft 40 being closely fitted into the shaft hole 52.

Figure 5B:
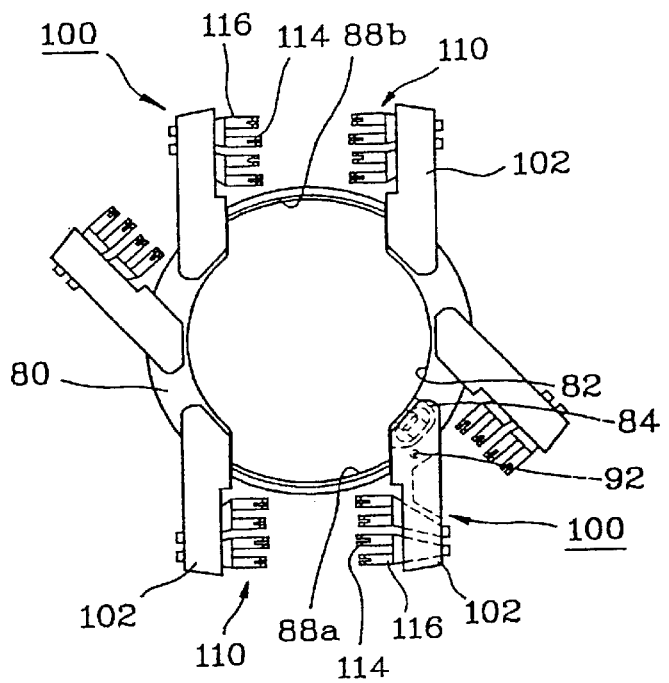

As shown in FIGS. 4, 5a and 5b, the connector 100 is arranged on the holder 80 by inserting the pair of posts 104a and 104b into the assembling hole 86. Next, the pin 106 is inserted into the corresponding guiding groove 92 to allow the connector 100 to be kept in a proper orientation with respect to the holder 80.

As shown in FIGS. 5a and 5b, the hook 108 is inserted into the assembling hole 86 until the head 108a snaps up the upper surface of the boss 84.

As described above, the construction where the connector 100 exists a separate component from the holder 80 in stead of one-pieced construction of the two as shown in the prior art has many an advantage.

First of all, it becomes easy to deposit and transport the holder 80 or the connector 100 with a reduced care thereto. Especially, as for the connector 100, deformation of the terminal plate 100 may be efficiently reduced during the transportation. In the prior art, since the combined form of the holder and the connector into one-piece body is bulky, there's a higher possibility of the terminal plate being deformed during the handling thereof.

Further, it is also easy to replace the damaged or old connector which is not performing the given task with new one.

Furthermore, the connecting device in accordance with the present invention has a compatibility with both the two-head type or the multi-head type head drum assembly. For example, in a case of the two-head type head drum assembly, only two connectors 100 are installed on the corresponding assembling holes 86, respectively, and, in a case of the six-head type head drum assembly, six connectors 100 can be mounted through all assembling holes 86, respectively.

After the connector 100 is fixed to the holder 80, the assembly of the holder 80 and connector 100 is positioned around the flange 50. At the moment, the lugs 90 ensure that the assembly is firmly maintained around the flange 50 and does not easily deviate from its intended position.

As shown in FIGS. 7a, 7b, 13a and 13b, the flange 50 around which the connecting device is arranged to be closely fitted into the center hole 22 of the upper drum 20. At the moment, the first spring plate 114 is downwardly depressed by the land 68a of the video head 60 at the first and the second contacts 122a and 122b, while the second spring plate 116 is upwardly depressed by the land 76a at the first and the second contacts 124a and 124b.

A second embodiment of the present invention is now described with reference to FIGS. 14 through 18. In describing the second embodiment, same reference numerals will be used to represent the same components as the components in foregoing drawings. Further, it should be noted that portions not described in the second embodiment be identical to those in the first embodiment.

As shown in FIGS. 14, 15a, 15b, 16 and 18, a flange 50', has a pair of center protuberances 54a' and 54b'. Each of the center protuberances 54a' and 54b' has a pair of edge protuberances 56a and 56b formed on both sides thereof. A holder 80' has a first semi circular member 80a and a second semi circular member 80b. Each of the semi circular members 80a and 80b has a pair of retainers 82a and 82b engaging with the edge protuberances 56a and 56b, respectively, allowing the semi circular member 80a and 80b to be maintained around the flange 50'.

Figure 16:
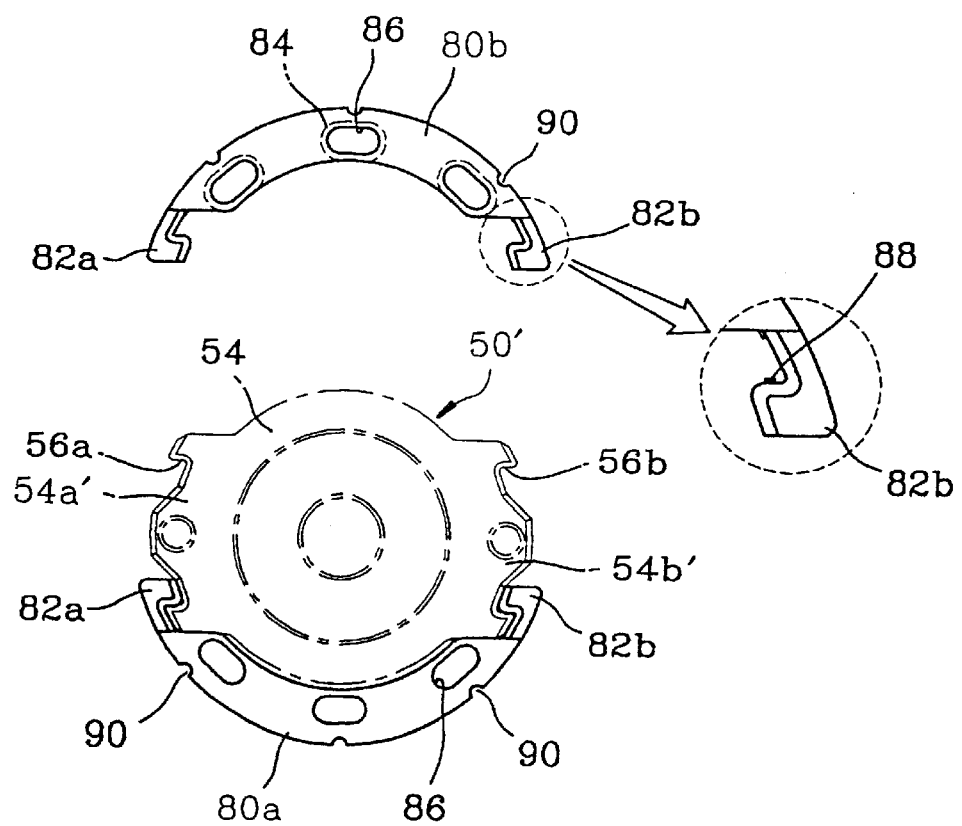
FIG. 16 gives a top planar view of a holder employed in the second embodiment of the present invention.
Figure 17A:
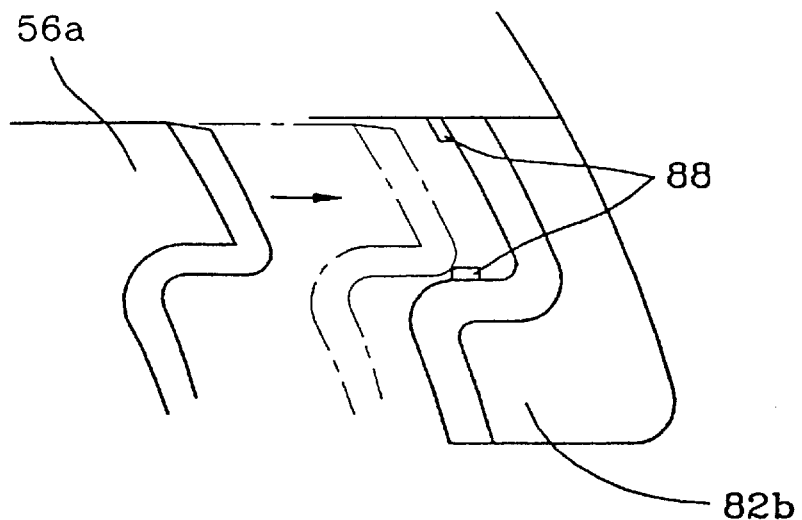
FIGS. 17A and 17B offer partial top planar views of a flange and the holder employed in the second embodiment of the present invention.
Figure 17B:
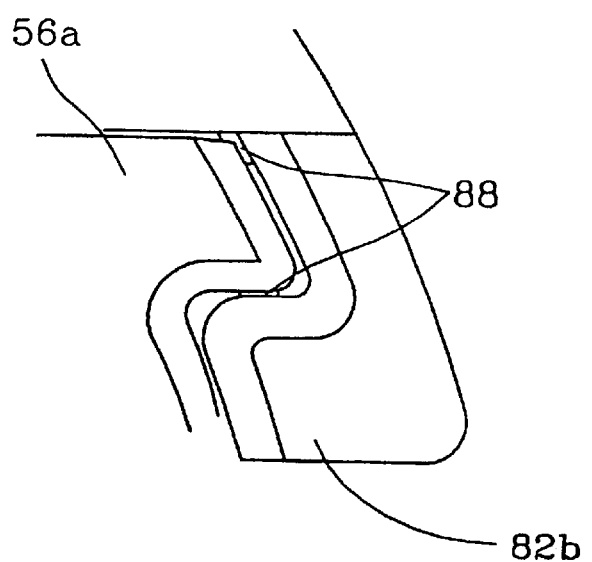
Figure 18:
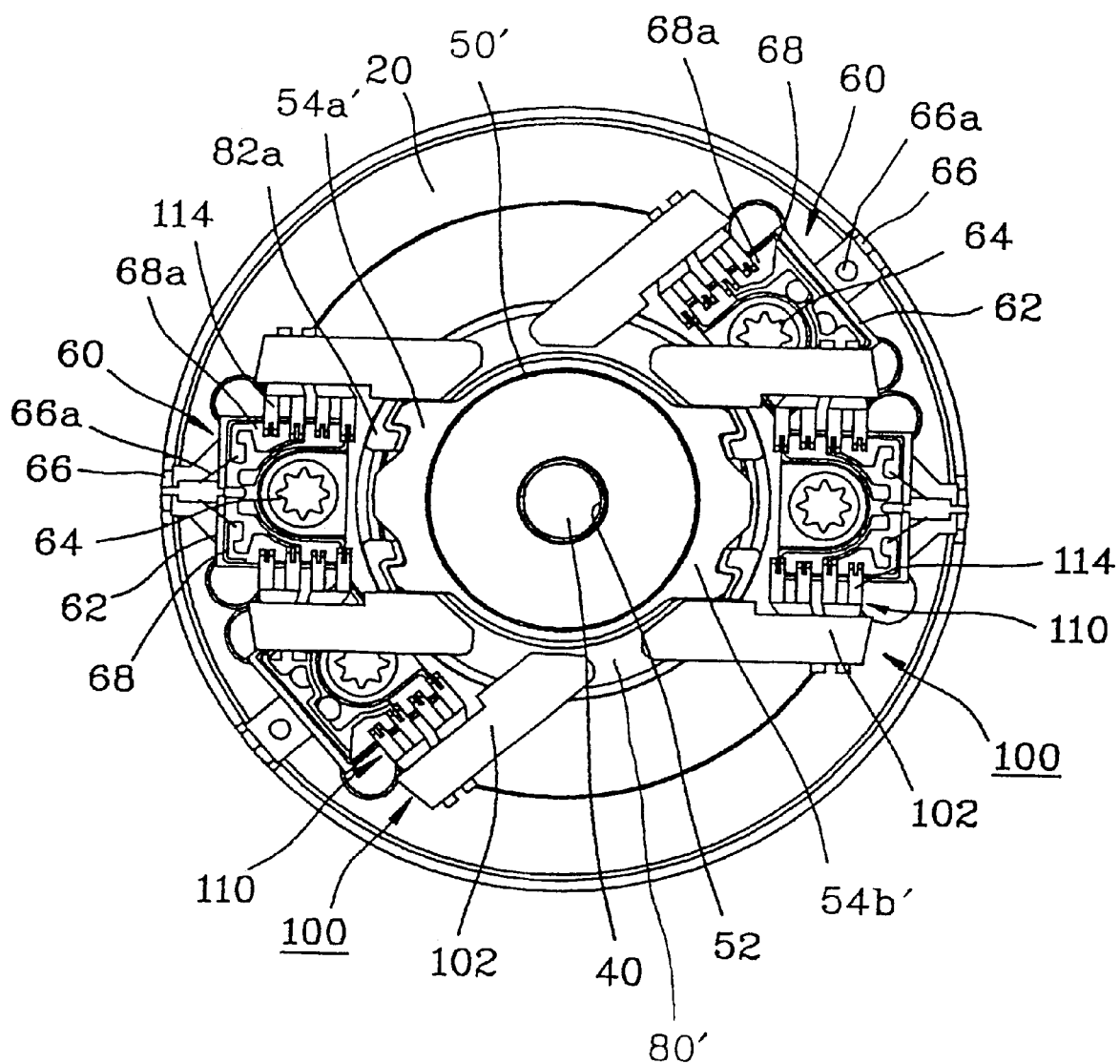
FIG. 18 shows a bottom view of the upper drum and the video head assembled thereonto in accordance with the second embodiment of the present invention.

As shown in FIGS. 16, 17a and 17b, a plurality of retainer lugs 88 are formed on an inner surface of each of the retainers 82a and 82b, which are transformable by a depressing force by the edge protuberances 56a and 56b when the holder 80' is positioned around the flange 50', being closely contacted thereon.

In assembling the second embodiment of the present invention, after the connectors 100 are fixed to the first semi circular member 80a and the second semi circular member 80b, the first semi circular member 80a is fixed around the flange 50' by retaining the retainers 82a and 82b into the edge protuberances 56a and 56b, respectively. At the moment, the retainer lugs 88 ensure that the first semi-circular member 80a is firmly maintained around the flange 50'. Similarly, the second semi circular member 80b is kept around the flange 50'.

Although the invention has been shown and described with respect to the preferred embodiments, it will be understood by those skilled in the art that various changes and modifications may be made without departing from the scope of the invention as defined in the following claims.

What is claimed is:

1. A head drum assembly incorporating therein a connecting device, the head drum assembly including an upper drum having at least two video heads on its lower surface, a flange into which an upper portion of a shaft is mounted on a center of the upper drum, a lower drum through which a lower portion of the shaft is mounted, a rotor transformer and a stator transformer installed within an inner space between the upper drum and the lower drum to transmit a signal between the upper drum and the lower drum, the connecting device comprising:

a holder of a general circular shape having a center hole through which the flange is fitted, a plurality of bosses on top thereof, each of the bosses being provided with an assembling hole; and a plurality of connectors, each of the connectors having a body provided with a pair of posts insertable into the assembling hole for allowing the body to be maintained on the holder and a terminal plate for elastically contacting the video head and for elastically contacting the rotor transformer, the terminal plate being integrally formed with the body, wherein the flange is provided with a pair of protuberances around its periphery and the holder has a pair of descent portions for accommodating the protuberances, respectively.

2. The head drum assembly of claim 1, wherein each of the descent portions has a plurality of lugs formed on its inner surface and being transformable to be closely contacted on the periphery of the flange.

3. A head drum assembly incorporating therein a connecting device, the head drum assembly including an upper drum having at least two video heads on its lower surface, a flange into which an upper portion of a shaft is mounted on a center of the upper drum, a lower drum through which a lower portion of the shaft is mounted, a rotor transformer and a stator transformer installed within an inner space between the upper drum and the lower drum to transmit a signal between the upper drum and the lower drum, the connecting device comprising:

a holder of a general circular shape having a center hole through which the flange is fitted, a plurality of bosses on top thereof, each of the bosses being provided with an assembling hole; and a plurality of connectors, each of the connectors having a body provided with a pair of posts insertable into the assembling hole for allowing the body to be maintained on the holder and a terminal plate for elastically contacting the video head and for elastically contacting the rotor transformer, the terminal plate being integrally formed with the body wherein said holder has a plurality of guiding grooves, each of the guiding grooves being formed on the holder near each of the bosses and the body has a pin protruding from an upper surface thereof and being inserted into one of the guiding grooves.

4. The head drum assembly of claim 3, wherein said pin is positioned on a center of an entire width of the body.

5. The head drum assembly of claim 3, wherein said pin is positioned on a place deviating from a center of an entire width of the body.

6. A head drum assembly incorporating therein a connecting device, the head drum assembly including an upper drum having at least two video heads on its lower surface, a flange into which an upper portion of a shaft is mounted on a center of the upper drum, a lower drum through which a lower portion of the shaft is mounted, a rotor transformer and a stator transformer installed within an inner space between the upper drum and the lower drum to transmit a signal between the upper drum and the lower drum, the connecting device comprising:

a holder of a general circular shape having a center hole through which the flange is fitted, a plurality of bosses on top thereof, each of the bosses being provided with an assembling hole; and a plurality of connectors, each of the connectors having a body provided with a pair of posts insertable into the assembling hole for allowing the body to be maintained on the holder and a terminal plate for elastically contacting the video head and for elastically contacting the rotor transformer, the terminal plate being integrally formed with the body, wherein said body further has a hook being insertable into the assembling hole and provided with a head snapping up an upper surface of the boss.

7. A head drum assembly incorporating therein a connecting device, the head drum assembly including an upper drum having at least two video heads on its lower surface, a flange into which an upper portion of a shaft is mounted on a center of the upper drum, a lower drum through which a lower portion of the shaft is mounted, a rotor transformer and a stator transformer installed within an inner space between the upper drum and the lower drum to transmit a signal between the upper drum and the lower drum, the connecting device comprising:

a holder of a general circular shape having a center hole through which the flange is fitted, a plurality of bosses on top thereof, each of the bosses being provided with an assembling hole; and a plurality of connectors, each of the connectors having a body provided with a pair of posts insertable into the assembling hole for allowing the body to be maintained on the holder and a terminal plate for elastically contacting the video head and for elastically contacting the rotor transformer, the terminal plate being integrally formed with the body, wherein said terminal plate includes an inner plate and an outer plate, each of the plates having a first spring plate bent upwardly to contact a land of the video head and second spring plate bent downwardly to contact a land of the rotor transformer.

8. The head drum assembly of claim 7, wherein the first spring plate has at its free end a first head contact and a second head contact, a head contact slit being formed therebetween, while the second spring plate has at its free end a first transformer contact and a second transformer contact, a transformer contact slit being formed therebetween.

9. The head drum assembly of claim 8, wherein said first head contact, the second head contact, the first transformer contact and the second transformer contact have thin golden films attached on their contact surfaces, respectively.

10. A head drum assembly incorporating therein a connecting device, the head drum assembly including an upper drum having at least two video heads on its lower surface and a center hole, a lower drum through which a lower portion of the shaft is mounted, a rotor transformer and a stator transformer installed within an inner space between the upper drum and the lower drum to transmit a signal between the upper drum and the lower drum, the connecting device comprising:

a flange closely fitted into the center hole of the upper drum and having a through hole through which an upper portion of the shaft is mounted and a pair of center protuberances, each of the center protuberances having a pair of edge protuberances formed on both sides thereof;

a holder having a first semi circular member and a second semi circular member, each of the semi circular members having a pair of retainers engaging with the pair of edge protuberances, respectively, and a plurality of bosses on top thereof, each of the bosses provided with an assembling hole; and a plurality of connectors, each of the connectors having a body provided with a pair of posts insertable into the assembling hole for allowing the body to be maintained on the holder, a terminal plate for elastically contacting the video head and for elastically contacting the lower transformer, the terminal plate being integrally formed with the body.

* * * * *